Figure 1:
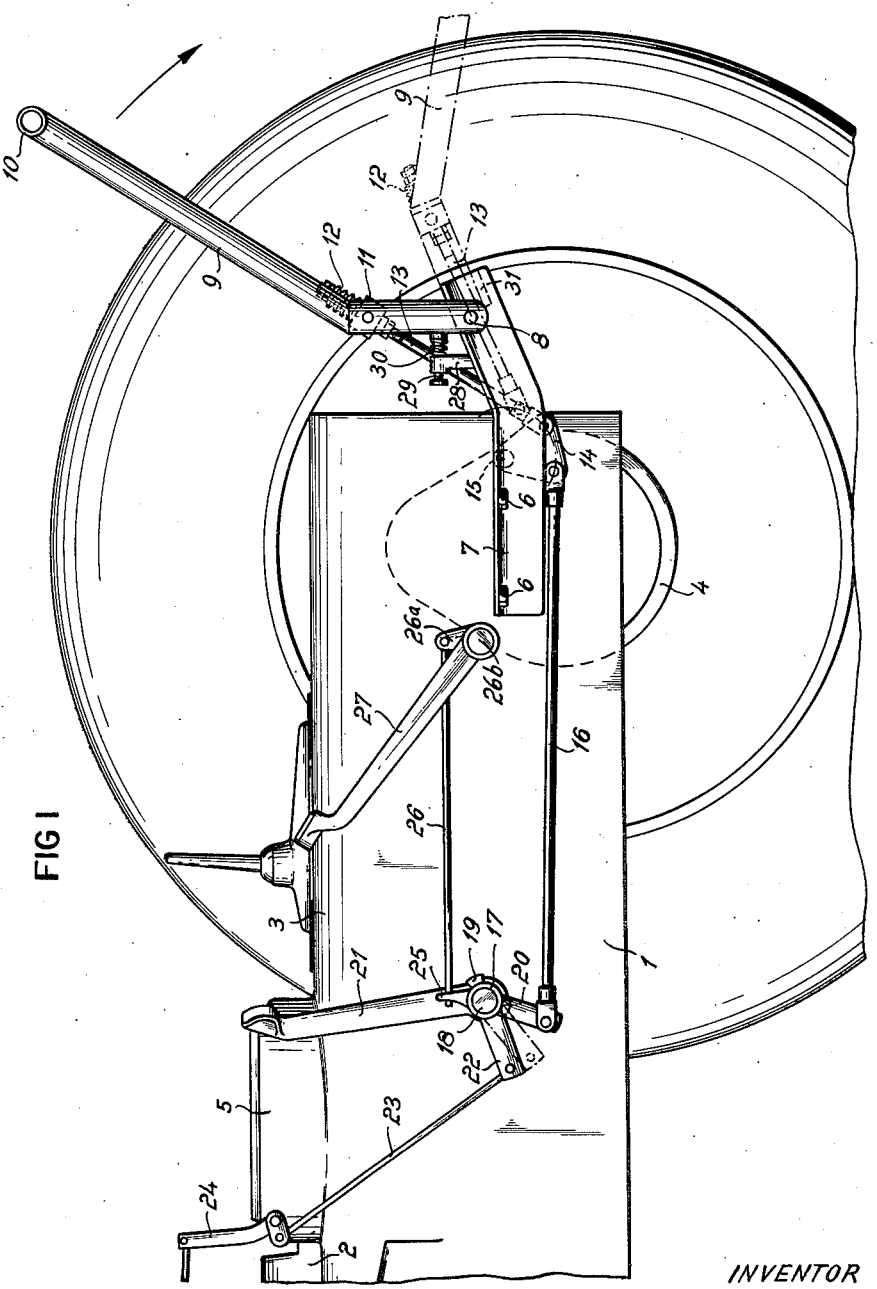

United States Patent Office 3,037,597
Patented June 5, 1962

3,037,597
SPEED CONTROL ARRANGEMENT
FOR TRACTORS
Karl Ruoff, Kirchheim (Teck), Wurttemberg, Germany,
assignor to Firma Dr. Ing. h.c. F. Porsche KG, Stuttgart-Zuffenhausen, Germany
Filed Oct. 6, 1958, Ser. No. 765,517
Claims priority, application Germany Nov. 9, 1957
11 Claims. (Cl. 192—3)

The present invention relates to an installation for controlling the speed of tractors, and more particularly, to an installation for reducing the speed of tractor-type vehicles, especially agricultural tractors provided with a driving unit, which includes a change-speed transmission provided with a hydraulic coupling connected ahead of the mechanical change-speed transmission and in which one of the driven shafts in the power-transmission train between the internal combustion engine and the driven wheels is adapted to be braked or held stationary by means of a brake which itself may be actuated by the driver or operator while standing adjacent to or to the side of the tractor—as compared to the usual brakes in similar vehicles which can be actuated by the driver or operator of the tractor only while seated or standing on the tractor—the tractor-type vehicle with which the present invention is concerned being more fully disclosed in the copending application Serial No. 720,715, filed March 11, 1958, and now Patent No. 2,950,794, entitled "Speed Control Arrangement for Tractor-Type Vehicles," and assigned to the assignee of the present application.

In the arrangement and construction according to the aforementioned copending application, the subject matter of which is incorporated herein by reference insofar as necessary, the actuating member for reducing the driving speed is operatively connected with the hand brake and is secured in the braking position thereof by a ratchet or detent-type locking device. A linkage or cable secured on the actuating member which is effective independently thereof serves thereby for purposes of adjusting the rotational speed of the internal combustion engine.

While the installation according to the aforementioned copending application has definite merits and considerable advantages over the prior art devices and has proved itself in principle, the separate actuation of the brake and of the gas adjusting linkage or cable is nonetheless complicated in the manual manipulation thereof. Furthermore, the braking capability or capacity of a hand brake is always relatively limited.

According to the present invention, the actuating member for purposes of reducing the velocity or driving speed is formed by a self-locking angle-type or knee-type lever which is operatively connected with or effective, by means of a linkage extending essentially parallel to the tractor drive unit, on the foot-brake pedal and the rotational speed adjusting member of the internal combustion engine.

By the use of such an arrangement, an installation is obtained which not only disposes of a relatively large braking capacity but also offers the advantage that, during actuation of the actuating member, simultaneously the rotational speed of the engine is automatically adjusted to the corresponding, most favorable range thereof without the necessity for the actuating person or operator to make any special provisions or take special steps therefor. At the same time, the operational safety is considerably increased since the actuating member is a self-locking angle-type or knee-type lever, and a separate detent or locking device may be dispensed with.

The installation in accordance with the present invention is advantageously so selected that the angle- or knee-lever, when pivoted or rotated through a dead center position thereof about the rotational axis thereof is automatically stopped, whereby a spring included or interconnected in the linkage maintains the tension in the braking installation from the initial position up to the end position of the lever limited by a stop or abutment member. For that reason, an adjusting sleeve or bushing rotatably supported on the brake shaft is pivotally connected with the linkage, which adjusting sleeve provided with oppositely disposed abutments or stop members serves for purposes of taking along or entraining the foot brake pedal and the rotational speed adjusting member of the engine. One of the abutments on the adjusting sleeve is engageable with a nose-like projection connected to and movable with the foot brake pedal for the simultaneous actuation of both of the steering brakes, one steering brake each being operatively associated with a corresponding driving wheel of the two oppositely disposed wheels. In that connection, it is well known that when tractors are driven over plowed land, the conventional steering devices which turn the front wheels by conventional steering means are inadequate to turn a tractor, particularly to turn the tractor with a small radius of curvature. Accordingly, it is known in the prior art and quite usual with tractors to steer the tractor by braking only either the right or the left rear wheel to thereby aid the tractor to turn about an arc having a very small radius of curvature. The actuating device which brings about the independent braking action for either rear wheel is commonly referred to and as such designated herein as steering brake means whereby the lever which brings about this actuation will be referred to hereinafter as steering brake lever.

The use of such a construction renders possible a simple and easily actuatable construction which may be readily supervised by the operator. The adjustment of the rotational speed of the internal combustion engine takes place by means of an angle or knee lever against the effect of a two-step abutment, whereby the one step which may be bridged corresponds to the idling speed position and the end step to the full load position of the rotational speed adjusting member. As a result thereof, the idling speed position as well as the position of the highest permissive rotational speed limit of the internal combustion engine are made readily recognizable or discernible as pressure point so that the actuating person always keeps the feel for the internal combustion engine. Furthermore, the spring-loaded abutment assures the certainty and safety that, if the actuating person or driver is distracted from the steering or control by other events and thereby releases the knee lever, the latter automatically returns to the idling position thereof. This characteristic behavior in accordance with the present invention is achieved in particular if the abutment is formed by a coil spring surrounding a guide bolt member which in the relieved position thereof limits the idling speed range and which in the tensioned or compressed condition thereof, when the windings thereof abut against each other, acts as a rigid stationary stop or abutment.

The braking and speed adjusting installation formed by the lever is secured on a bracket mounted on the driving unit in a readily detachable manner. The installation in accordance with the present invention may thereby readily be removed without any great disassembling effort if it is no longer used.

Accordingly, it is an object of the present invention to provide a speed control arrangement for a tractor-type vehicle which assures great safety in the operation thereof and which permits the driver or actuating person to control the tractor while standing alongside the same.

Another object of the present invention is the provision of a speed control arrangement for a tractor, particularly agricultural tractors in which the operator moves alongside the tractor during agricultural operations, and which automatically adjusts the rotational speed of the tractor while adjusting the change-speed transmission thereof to the most favorable speed range.

Still another object of the present invention is the provision of a speed control arrangement for a tractor which is provided with a two-step abutment so as to make clearly discernible to the operator the idling and full load position of the actuating member and to thereby preserve at all times a feel for the operator.

A further object of the present invention is the provision of an actuating member adapted to be operated by the driver or operator of the tractor while standing alongside the tractor for controlling the driving speed thereof which actuating member will return automatically to the idling speed thereof when released.

A further object of the present invention relates to the provision of a speed control for a tractor which is operative to actuate the brake system of the tractor, such as the brake system acting on some or all of the wheels and normally actuated by a foot brake pedal, as compared to the actuation of a hand brake system which has a much less braking capacity.

A further object of the present invention is the provision of simple construction for a speed control arrangement for tractors which is relatively inexpensive in manufacture and installation which requires relatively few parts and which may be readily detachable in case of non-use thereof.

Figure 2:
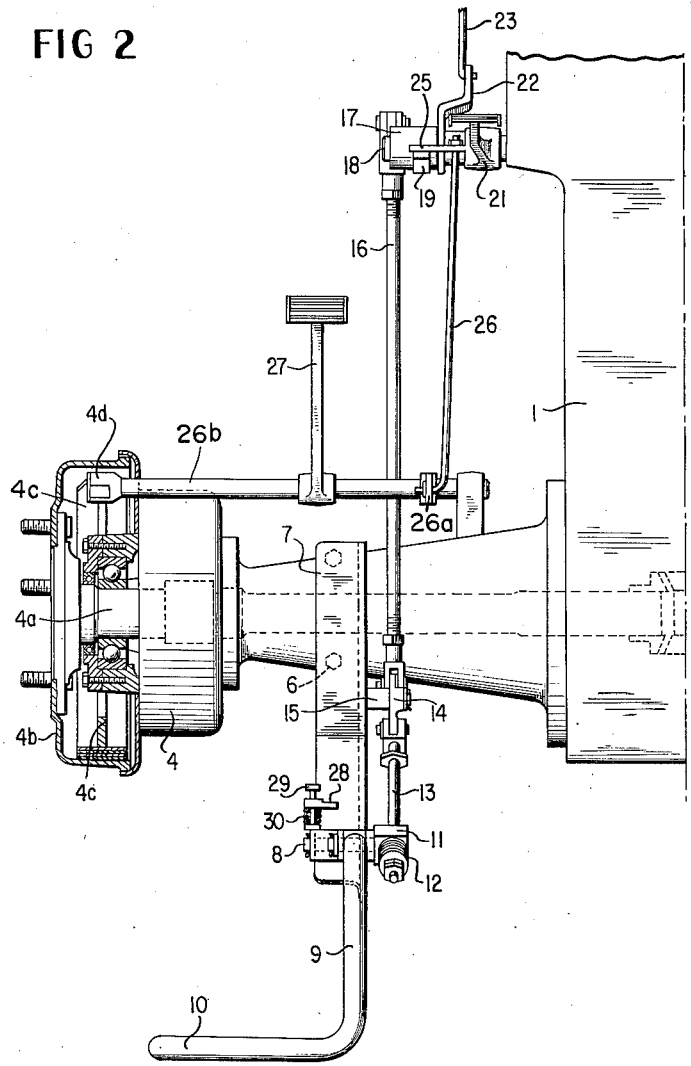

These and other objects, features and advantages of the present invention will become more obvious from the following description when taken in connection with the accompanying drawing, which shows in the several views thereof one embodiment in accordance with the present invention, and wherein FIGURE 1 is a partial side view of a tractor provided with a braking and engine speed adjusting installation in accordance with the present invention, and FIGURE 2 is a partial top plan view of the braking and engine speed adjusting installation in accordance with the present invention illustrated in FIGURE 1.

Referring now to the drawings, wherein like reference numerals are used throughout the two views to designate corresponding parts, reference numeral 1 designates therein the power or driving unit of the tractor which consists of an internal combustion engine 2, a change-speed transmission 3 of any suitable construction known in the prior art and the axle gear 4 of the tractor. The axle gear 4 of the tractor effectively provides a driving connection from the drive unit 1 of the tractor to the driven shaft 4a to which is operatively connected the brake drum 4b of any suitable construction, as is well known in the prior art. The brake drum 4b is thereby adapted to be braked by a suitable brake mechanism including relatively fixed brake shoes 4c provided along the outer surfaces thereof with brake linings adapted to engage with the internal surfaces of the brake drum 4b. For purposes of actuating the brake mechanism, there is provided a conventional spreading cam 4d mounted on shaft 26b which is actuated in a manner to be described more fully hereinafter. By rotating the shaft 26b, the cam portions of the spreading cam member 4d engage with the free ends of the brake shoes 4c, pivoted about the opposite ends thereof, as is conventional, to thereby force the brake linings of the brake shoes 4c into engagement with the internal surface of the brake drum 4b and therewith produce the braking effect. It is understood, of course, that each rear wheel of the tractor, of which only the left rear wheel is shown, the right rear wheel arrangement being of mirror-image-like construction, is provided with an analogous brake system. A hydraulic coupling 5, not illustrated herein in detail is arranged in a manner known, per se, between the internal combustion engine 2 and the change-speed transmission 3. A bracket 7 is detachably secured at the axle gear 4 by means of two bolts 6, which bracket 7 carries an angle or knee lever 9 rotatably supported about a bolt member 8. The knee lever 9 consists essentially of a tubular member made of suitable material and extends with the free angularly-bent end 10 thereof outwardly beyond the normal contours of the tractor so as to facilitate actuation thereof by the operator while standing or walking alongside the tractor. The angle or knee lever 9 is provided with a rotatable abutment 11 against which a brake rod or link 13 abuts by the interposition of a set of cup-shaped springs 12, whereby the abutment 11 may be, for example, of circular construction with a central aperture for the passage therethrough of the brake linkage 13. The springs 12 maintain tension on the linkage 13 during actuation of the brakes and during overcenter movement of the lever 9 as described hereinafter. The brake rod 13 is operatively connected with a plate member 14 which is rotatably secured about a pin 15 arranged at the bracket 7. A linkage or rod 16 which extends parallel to the tractor drive unit 1 is pivotally secured to the plate 14, the rod 16 or linkage 16 being operatively connected at the other end thereof with an adjusting sleeve or bushing 17. The adjusting sleeve 17 is rotatably placed over the brake shaft 18 and possesses abutments 19 and 20, which are arranged along the circumference of the adjusting sleeve 17. The abutment or stop member 19 is coordinated to or arranged to cooperate with the foot-brake pedal 21, and the abutment 20 is coordinated or arranged to cooperate with a pivotal lever member 22 which is supported in a freely rotatable manner on the brake shaft 18. The pivotal lever member 22 is operatively connected by means of a control rod 23 with the adjusting member 24 adjusting the rotational speed of the internal combustion engine 2. The abutment member 19 on adjusting sleeve 17 is engageable with a nose-like projection 25 which is connected to the brake actuating foot pedal 21 and is also operatively connected over rod 26, the intermediate link 26a and the brake shaft 26d with the brake lever 27 shown in the form of a foot pedal of the brake system described hereinabove. The rod 18 extends to the opposite side of the tractor (not shown) and parts corresponding to the projection 25 movable with the rod 18, the rod 26, the intermediate link 26a, the brake shaft 26b and the spreading cam 4d are duplicated at the opposite side of the tractor although a second brake pedal 21 is obviously not required since operation of the illustrated brake pedal 21 will actuate the brake mechanisms 4a through 4d of both wheels as described herein. As will be more apparent from FIGURE 2 of the drawing, the rod 26 is adapted to slide forwardly through the opening provided therefor within projection 25 when the rod 26 is thus displaced by depressing the foot pedal 27 so as to permit thereby independent actuation of the respective brake systems disposed at opposite sides of the vehicle. However, as pointed out hereinabove, when the brake pedal 21 is depressed, the respective projections 25 at each side of the vehicle will simultaneously displace the respective rods 26 in the forward direction to thereby simultaneously actuate the brakes of both rear wheels. The knee or angle lever 9 cooperates with a two-step spring-loaded abutment 28 for purposes of adjusting the rotational speed, which abutment 28 consists of a guide bolt member 29 and a coil spring 30 surrounding the bolt member 29.

*Operation*

The operation of the speed control arrangement in accordance with the present invention is as follows:

*Normal Use of Foot Brake System*

By depressing the foot pedal 21, which is rigidly connected with the brake shaft 18, the rod 26 is displaced in the driving direction of the tractor as a result of the operative connection thereof with the nose-like projection 25 connected with the foot pedal 21 whereby the brake shaft 26b is rotated about its axis by means of the intermediate link 26a. A spreading cam 4d (FIGURE 2) of conventional construction which is mounted at the free outward end of the brake shaft 26b, thereby spreads the free ends of the brake shoes 4c and therewith engages the brake linings thereof against the inner surface of the brake drum 4b as is well known in the art. The oppositely disposed vehicle wheel is braked simultaneously therewith in an analogous manner by a corresponding rod 26 and a corresponding brake shaft 26b connected therewith by means of a link 26a, whereby these corresponding parts belonging to the brake system of the right rear wheel are not shown in the drawing for sake of clarity and simplicity. It is obvious that the normal actuation of the foot brake 21 has no influence on the so-called "Hydrostop installation" consisting of the parts 10 through 17. The parts 10 through 17 of the "Hydrostop installation" remain in their original position as they are not taken along by actuation of the foot brake 21. On the other hand, the steering brake lever 27 of the left rear wheel steering brake as well as the corresponding steering brake lever on the opposite side of the tractor are taken along by the pivoting movement of the brake shaft 26b since they are each rigidly connected therewith.

*Steering Brake Actuation*

As pointed out hereinabove, the steering brake system is used for individually braking either the right or left rear wheel of the tractor, a separate steering brake elever 27 being provided for that purpose on each side of the tractor. By depressing the steering brake lever constituted in the illustrated embodiment by the foot pedal 27 the brake shaft 26b rigidly connected therewith is rotated about its axis whereby the spreading cam 4d again forces the brake linings provided at brake shoes 4c against the brake drum 4b as mentioned hereinabove. Since during this braking operation, the respective brake shaft 26b is rotated about its axis, its corresponding intermediate link 26a is also taken along and thereby displaces the rod 26 in the forward direction, i.e., in the driving direction of the tractor. Since the rod 26 is force-lockingly connected with the brake pedal 21 by means of the nose-like projection 25 in only one direction, namely when the brake pedal 21 is depressed, the rod 26, during actuation of the foot pedal 27 slides freely through the nose-like projection 25 and has no influence either on the brake pedal 21 or on the parts 10 to 17 of the "Hydrostop" installation. Since the wheel disposed oppositely to the braked wheel is not braked at the same time, the tractor turns, aided by the steerable wheels, more or less on the spot either toward the left over the right depending on which of the two levers 27 is depressed.

*Hydrostop Installation*

In the position of the installation shown in the drawing, a so-called "creeping-speed" or slow-speed of the tractor used, for example, during agricultural operations, is engaged in which the tractor moves across the field with full rotational engine speed and relatively very slow driving speed. If the angle or knee lever 9 is now pivoted or swung by manipulating the handle 10 in the direction of the arrow shown in the drawing, then the linkage 13, 16 is displaced toward the right as viewed in the drawing and the adjusting sleeve 17 is thereby rotated in the counterclockwise direction During this counterclockwise rotation of sleeve 17, the lever 22, having a suitable abutment counter surface, for example, at the hub thereof, and therewith the adjusting rod 33 follow the abutment 20 in the counterclockwise direction so that the rotational speed of the engine 2 is correspondingly reduced by appropriate adjustment of the engine speed control member 24. When the spring 30 is relieved, then the angle or knee lever 9 is in the position thereof which corresponds to the idling speed of the internal combustion engine 2.

A further displacement or pivotal movement of the angle or knee lever 9 in the direction of the arrow causes, by means of linkage 13, 16, the abutment 19 of the adjusting sleeve 17 to come into abutment with projection 25 connected to the foot brake pedal 21 and thereby automatically depresses the foot brake pedal 21. At the same time, the projection 25 causes by means of rod 26 an actuation or engagement of the steering brake 27 so that the tractor is automatically braked, as described hereinabove. The axle drive shafts held thereby stationary have an operative feed-back effect on the power transmission train up to the hydraulic coupling 5 operating with slippage, whereby the drive between the internal combustion engine 2 and the change-speed transmission is separated as more fully disclosed in the aforementioned copending application and in the further copending application Serial No. 725,324, filed March 31, 1958, entitled "Power Transmission Unit Especially for Tractor," and assigned to the assignee of the present invention. In order that the angle or knee lever 9 remains automatically in the braking position indicated in the drawing in dot-and-dash line, it is displaced in such a manner that the effective line of the rod 13 extends below the pivot point of lever 9 provided by bolt member 8. The lower end of the lever 9 together with the bracket 7 and the linkages extending from the lever form a toggle structure which is readily discernible in the drawing. The lever 9 is thereby brought into an over-center position of the toggle from which it can no longer return by itself. The cup-shaped spring packet 12 maintains the tension in the actuating linkages of the brake installation over the entire adjusting range thereof. The end position of the angle or knee lever 9 is determined by an abutment 31 arranged at the bracket 7.

If the angle or knee lever 9 is moved in a direction opposite the arrow for purposes of intermittent or step-like forward movement of the tractor, then an opposite sequence of operation takes place whereby the brake is released at first and the tractor again begins to move thereupon. The driving speed thereof may be selected at will after overcoming the idling speed point at the abutment 28 within the range of partial to full load.

If the installation is to be detached, then it is only necessary to loosen the bolts 6 and remove a securing disk (not shown) provided at the adjusting sleeve 17, whereupon the entire installation may be readily removed.

While I have shown and described one embodiment in accordance with the present invention, it is understood that the same is not limited thereby but is susceptible of many changes and modifications within the spirit and scope of the present invention. For example, any suitable linkage may be used in the place of the rod shown in the drawing. Similarly, any suitable spring construction may be used for purposes of providing the necessary tensions in the various parts of the installation in accordance with the present invention.

The change-speed transmission may be of any suitable construction and may be, for example, of the type more fully disclosed in the aforementioned copending application, Serial No. 725,324, filed March 31, 1958, entitled "Power Transmission Unit Especially for Tractors," and assigned to the assignee of the present application. Furthermore, the tractor may be of the type adapted to be steered and controlled by the operator while standing or walking alongside the tractor, as more fully disclosed, for example, in the copending application Serial No. 735,284, filed May 14, 1958, and now Patent No. 2,955,838, entitled "Steering Arrangement for Tractors," and assigned to the assignee of the present application, and/or as disclosed in the copending application Serial No. 722,873, filed March 21, 1958, entitled "Control Arrangement for Tractors," and also assigned to the assignee of the present application.

Thus it may be readily seen that the present invention is susceptible of many changes and modifications within the spirit and scope thereof, and I, therefore, do not wish

I claim:
1. Installation for reducing the driving speed of tractors provided with a drive unit and wheels driven thereby, said drive unit including an internal combustion engine, a change-speed transmission driven by said engine and having a hydraulic coupling connected ahead of the mechanical change-speed transmission thereof, and a driven shaft disposed in the power-transmitting train between said internal combustion engine and the driven wheels, brake means operable to brake said shaft and therewith said wheels and adapted to be braked by the operator while standing alongside the tractor, engine adjusting means for adjusting the rotational speed of said internal combustion engine, footbrake means operative to apply the wheel brake means, and self-locking lever means at said tractor adapted to be operated by the driver when standing alongside said tractor, and including linkage means between said lever means, on the one hand, and said foot brake means and said adjusting means, on the other, for adjustably controlling said foot brake means and said engine adjusting means in dependence on the position of said lever means to thereby enable simultaneous manual control adjustment o fthe speed of said internal combustion engine and of the foot brake means of said tractor by appropriate manipulation of said lever means, said self-locking lever means being movable through one range of movement for adjusting said engine adjusting means and through another range of movement for actuating said foot brake means, said lever means being self-locking only in said last-mentioned range of movement.

2. An installation for reducing the driving speed of tractors according to claim 1, wherein said lever means is an angle lever, the free end of said lever extending outwardly generally transversely of the longitudinal direction of the tractor to facilitate actuation thereof by a driver standing or walking alongside the tractor.

3. An installation for reducing the driving speed of tractors according to claim 2, wherein said lever means and said linkage means include toggle means pivotally supporting said angle lever on said tractor in such a manner as to provide an over-center position thereof in which said angle lever is automatically stopped.

4. An installation for reducing the driving speed of tractors according to claim 3, wherein an abutment is provided to determine the overcenter position in which said angle lever is stopped and wherein said linkage means includes spring means for maintaining a spring tension in the linkage means of the brake installation throughout said another range of movement of said angle lever up to the overcenter position thereof determined by said abutment.

5. An installation for reducing the driving speed of tractors according to claim 1, wherein said brake means includes a brake shaft and a brake pedal rotatably mounted on said brake shaft, and wherein said linkage means includes sleeve means rotatably mounted on said brake shaft and provided with oppositely disposed abutment means for entraining said brake pedal and said engine adjusting means.

6. An installation for reducing the driving speed of tractors according to claim 5, further comprising a steering brake means in said tractor, and wherein said sleeve means includes projection means operatively connected with said steering brake means to adjustably control the latter upon rotation of said sleeve means.

7. An installation for reducing the driving speed of tractors according to claim 1, further comprising two-step abutment means at said tractor, said lever means operating against the effect of said two-step abutment means, one of the steps of said abutment means which may be passed corresponding to the idling position of said engine and the other step thereof to the full load position of said engine adjusting means.

8. An installation for reducing the driving speed of tractors according to claim 7, wherein said abutment means includes a guide bolt member and a helical coil spring surrounding said guide bolt member, said helical coil spring limiting in the released condition thereof the idling speed range and being operative in the compressed condition thereof, wherein the windings abut against one another, as a rigid abutment to define the full load position of the engine adjusting means, said spring biasing said lever means to the range of engine idling speed and acting automatically to return said lever means to the idling range when released by the driver in the full load position.

9. An installation for reducing the driving speed of tractors according to claim 1, further comprising bracket means for supporting thereon said lever means and linkage means, and means for readily detachably mounting said bracket means on said tractor.

10. An installation for reducing the driving speed of tractors provided with a drive unit including an internal combustion engine, a change-speed transmission driven by said engine and having a hydraulic coupling connected ahead of a mechanical change-speed transmission thereof, and a driven shaft disposed in the power-transmitting train between said internal combustion engine and the driven wheels, brake means operable to brake said shaft and said wheels, foot brake means operative to actuate said brake means, engine adjusting means for adjusting the rotational speed of said internal combustion engine, lever means on said tractor including a manually-actuatable portion extending outwardly at the side of said tractor and adapted to be operated by a driver when standing alongside the tractor, and linkage means interconnecting said lever means with both said foot brake means and said engine adjusting means for adjustably controlling said foot brake means and said engine adjusting means in dependence on the position of said lever means to thereby enable manual control adjustment of both engine speed and of the actuation of said brake means by appropriate manipulation of only said lever means, means for biasing said lever means to an intermediate position wherein said brake means is inactive and said engine adjusting means is in an engine idling position, said lever means being manually movable against said bias in one direction from said intermediate position to actuate said engine adjusting means to increase the speed of said engine, said lever means being manually movable in the opposite direction from said intermediate position to actuate said foot brake means to apply said brake means.

11. Apparatus according to claim 10 wherein said linkage means includes a spring interconnecting said lever means and said linkage means, said spring transmitting to the linkage means the brake actuating movement of the lever means when the latter is moved in opposite direction, said linkage means being positively connected to said linkage means for operation thereby when the latter is moved from said intermediate position in said one direction.

References Cited in the file of this patent
UNITED STATES PATENTS

| | | |
|---|---|---|
| 1,595,523 | Oliver | Aug. 10, 1926 |
| 2,169,949 | Haupt | Aug. 15, 1939 |
| 2,175,188 | Fuller | Oct. 10, 1939 |
| 2,555,417 | Martin | June 5, 1951 |
| 2,828,643 | Fisher | Apr. 1, 1958 |